(12) United States Patent
McGrath et al.

(10) Patent No.: US 7,409,144 B2
(45) Date of Patent: Aug. 5, 2008

(54) VIDEO AND AUDIO INFORMATION PROCESSING

(75) Inventors: Mark John McGrath, Bracknell (GB); Morgan William Amos David, Farnham (GB); Jonathan Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1032 days.

(21) Appl. No.: 10/006,480

(22) Filed: Dec. 6, 2001

(65) Prior Publication Data

US 2002/0122659 A1 Sep. 5, 2002

(30) Foreign Application Priority Data

Dec. 7, 2000 (GB) ................................. 0029880.2

(51) Int. Cl.
- *H04N 5/00* (2006.01)
- *H04N 5/76* (2006.01)
- *H04N 7/00* (2006.01)
- *H04N 5/235* (2006.01)
- *H04N 5/228* (2006.01)

(52) U.S. Cl. ........................ 386/117; 386/95; 348/222.1

(58) Field of Classification Search .................... 386/38, 386/117, 95; 358/906, 909.1; 348/222.1
See application file for complete search history.

(56) References Cited

U.S. PATENT DOCUMENTS

| | | | |
|---|---|---|---|
| 4,057,830 A | * | 11/1977 | Adcock ........................ 386/117 |
| 5,550,966 A | | 8/1996 | Drake et al. |
| 5,893,095 A | * | 4/1999 | Jain et al. ........................ 707/6 |
| 6,833,865 B1 | * | 12/2004 | Fuller et al. .............. 348/231.2 |

FOREIGN PATENT DOCUMENTS

| | | |
|---|---|---|
| EP | 0597450 A2 | 5/1994 |
| EP | 0607010 A1 | 7/1994 |
| EP | 0 838 767 | 4/1998 |
| EP | 0 841 665 | 5/1998 |
| EP | 0 982 947 | 3/2000 |
| EP | 1 033 857 | 9/2000 |

(Continued)

OTHER PUBLICATIONS

Jane Hunter: "MPEG-7 Behind the Scenes" D-LIB Magazine, 'Online! vol. 5, No. 9, Sep. 30, 1999, pp. 1-12, XP002277600 ISSN: 1082-9873 Retrieved from the Internet: <URL:www.dlib.org./dlib/september99/hunter/09hunter.html> 'retrieved on Apr. 19, 2004!

(Continued)

*Primary Examiner*—Thai Tran
*Assistant Examiner*—Nigar Chowdhury
(74) *Attorney, Agent, or Firm*—Oblon, Spivak, McClelland, Maier & Neustadt, P.C.

(57) ABSTRACT

A camera-recorder apparatus comprises an image capture device operable to capture a plurality of video images; a storage medium by which the video images are stored for later retrieval; a feature extraction unit operable to derive image property data from the image content of at least one of the video images substantially in real time at the capture of the video images, the image property data being associated with respective images or groups of images; and a data path by which the camera-recorder apparatus is operable to transfer the derived image property data to an external data processing apparatus.

10 Claims, 7 Drawing Sheets

FOREIGN PATENT DOCUMENTS

| | | |
|---|---|---|
| GB | 2 233 529 | 1/1991 |
| GB | 2 340 987 | 3/2000 |
| JP | H05-191699 | 7/1993 |
| JP | H06-165009 | 6/1994 |
| JP | H06-217254 | 8/1994 |
| JP | H10/224735 | 8/1998 |
| WO | WO 96/01022 | 1/1996 |

OTHER PUBLICATIONS

Brunelli R et al: "A Survey on the Automatic Indexing of Video Data" Journal of Visual Communication and Image Representation, Academic Press, Inc, US, vol. 10, No. 2, Jun. 1999, pp. 78-112, XP002156354 ISSN: 1047-3203.

* cited by examiner

VIDEO AND AUDIO INFORMATION PROCESSING

BACKGROUND OF THE INVENTION

1. Field of the Invention

The present invention relates to the field of video and audio information processing.

2. Description of the Prior Art

Video cameras produce audio and video footage that will typically be extensively edited before a broadcast quality programme is finally produced. The editing process can be very time consuming and therefore accounts for a significant fraction of the production costs of any programme.

Video images and audio data will often be edited "off-line" on a computer-based digital non-linear editing apparatus. A non-linear editing system provides the flexibility of allowing footage to be edited starting at any point in the recorded sequence. The images used for digital editing are often a reduced resolution copy of the original source material which, although not of broadcast quality, is of sufficient quality for browsing the recorded material and for performing off-line editing decisions. The video images and audio data can be edited independently.

The end-product of the off-line editing process is an edit decision list (EDL). The EDL is a file that identifies edit points by their timecode addresses and hence contains the required instructions for editing the programme. The EDL is subsequently used to transfer the edit decisions made during the off-line edit to an "on-line" edit in which the master tape is used to produce a high-resolution broadcast quality copy of the edited programme.

The off-line non-linear editing process, although flexible, can be very time consuming. It relies on the human operator to replay the footage in real time, segment shots into sub-shots and then to arrange the shots in the desired chronological sequence. Arranging the shots in an acceptable final sequence is likely to entail viewing the shot, perhaps several times over, to assess its overall content and consider where it should be inserted in the final sequence.

The audio data could potentially be automatically processed at the editing stage by applying a speech detection algorithm to identify the audio frames most likely to contain speech. Otherwise the editor must listen to the audio data in real time to identify its overall content.

Essentially the editor has to start from scratch with the raw audio frames and video images and painstakingly establish the contents of the footage. Only then can decisions be made on how shots should be segmented and on the desired ordering of the final sequence.

SUMMARY OF THE INVENTION

The invention provides a camera-recorder apparatus comprising:

an image capture device operable to capture a plurality of video images;

a storage medium by which the video images are stored for later retrieval;

a feature extraction unit operable to derive image property data from the image content of at least one of the video images substantially in real time at the capture of the video images, the image property data being associated with respective images or groups of images; and a data path by which the camera-recorder apparatus is operable to transfer the derived image property data to an external data processing apparatus.

The invention recognises that the time taken for a human editor to review the material on a newly acquired video tape or the like places a great burden on the editing process, slowing down the whole editing operation. However, simply automating the review of the material at an editing apparatus would not reap significant benefits. Although such a simple automation would reduce the need for (expensive) human intervention, it would not significantly speed up the process. This factor is important in time-critical applications such as news-gathering.

In contrast, in the invention, by deriving data characteristic of the image content substantially in real time at the camera-recorder apparatus, the data is ready to be analysed much more quickly, and without necessarily the need for a machine to review the entire video material. This can dramatically speed up automated preparation for the editing process.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
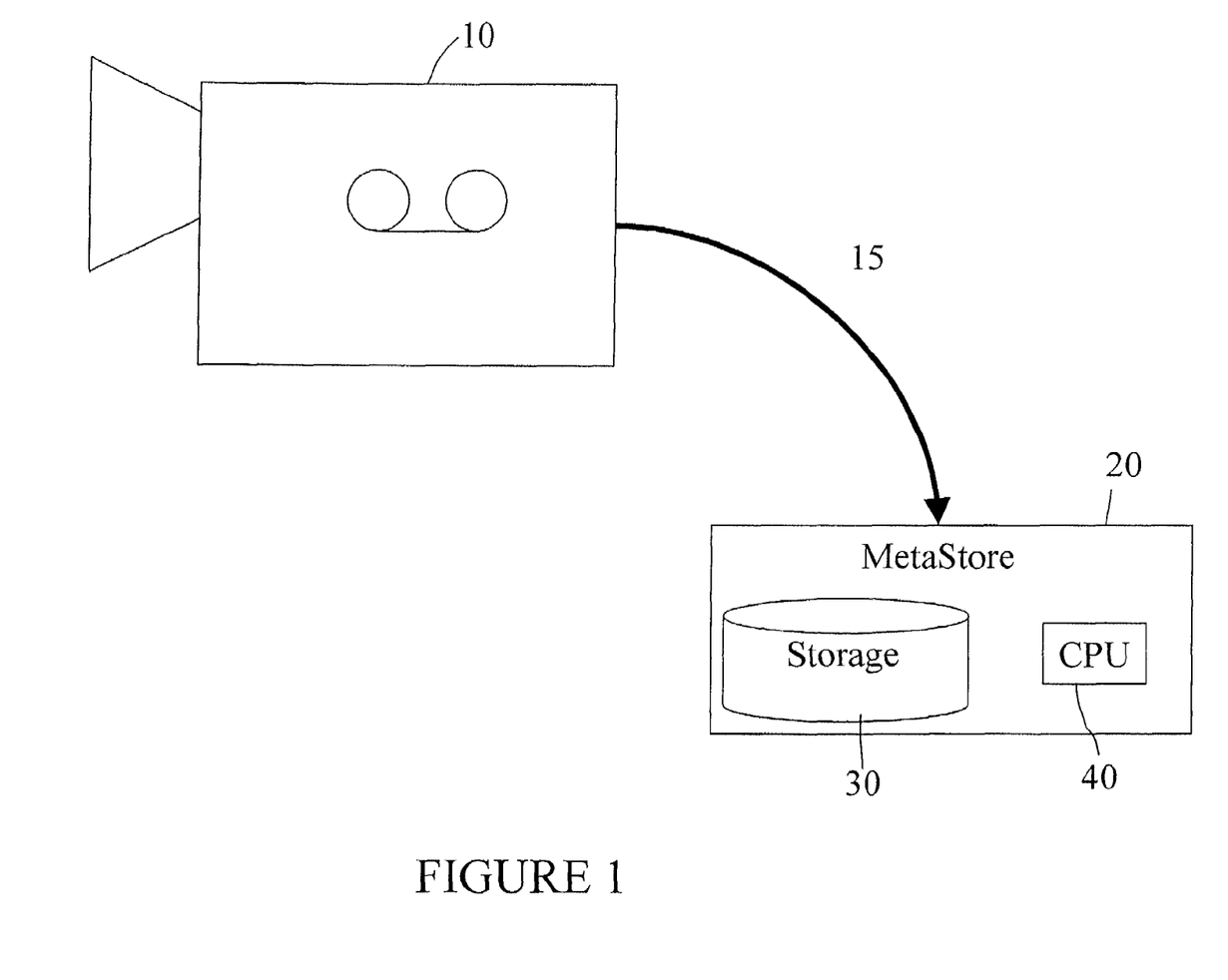
FIG. 1 shows a downstream audio and video processing system according to embodiments of the invention.

FIG. 1 shows a downstream audio-visual processing system according to the present invention. A camera 10 records audio and video data on video tape in the camera. The camera 10 also produces and records supplementary information about the recorded video footage known as "metadata". This metadata will typically include the recording date, recording start/end flags or timecodes, camera status data and a unique identification index for the recorded material known as an SMPTE UMID.

The UMID is described in the March 2000 issue of the "SMPTE Journal". An "extended UMID" comprises a first set of 32 bytes of "basic UMID" and a second set of 32 bytes of "signature metadata".

The basic UMID has a key-length-value (KLV) structure and it comprises:

A 12-byte Universal Label or key which identifies the SMPTE UMID itself, the type of material to which the UMID refers. It also defines the methods by which the globally unique Material and locally unique Instance numbers (defined below) are created.

A 1-byte length value which specifies the length of the remaining part of the UMID.

A 3-byte Instance number used to distinguish between different 'instances' or copies of material with the same Material number.

A 16-byte Material number used to identify each clip. A Material number is provided at least for each shot and potentially for each image frame.

The signature metadata comprises:

An 8-byte time/date code identifying the time of creation of the "Content Unit" to which the UMID applies. The first 4-bytes are a Universal Time Code (UTC) based component.

A 12-byte value which defines the (GPS derived) spatial co-ordinates at the time of Content Unit creation.

3 groups of 4-byte codes which comprise a country code, an organisation code and a user code.

Apart from the basic metadata described above which serves to identify properties of the recording itself, additional metadata is provided which describes in detail, the contents of the recorded audio data and video images. This additional metadata comprises "feature-vectors", preferably on a frame-by-frame basis, and is generated by hardware in the camera 10 by processing the raw video and audio data, in real time as (or immediately after) it is captured.

The feature vectors could for example supply data to indicate if a given frame has speech associated with it and whether or not it represents an image of a face. Furthermore the feature vectors could include information about certain image properties such as the magnitudes of hue components in each frame.

The main metadata, which includes a UMID and start/end timecodes, could be recorded on videotape along with the audio and video data, but preferably it will be stored using a proprietary system such as Sony's "Tele-File®" system. Under this Telefile system, the metadata is stored in a contactless memory integrated circuit contained within the videocassette label which can be read, written and rewritten with no direct electrical contact to the label.

All of the metadata information is transferred to a metastore 20 along a metadata data path 15 which could represent videotape, a removable hard disk drive or a wireless local area network (LAN). The metastore 20 has a storage capacity 30 and a central processing unit 40 which performs calculations to effect full metadata extraction and analysis. The metastore 20 uses the feature-vector metadata: to automate functions such as sub-shot segmentation; to identify footage likely to correspond to an interview as indicated by the simultaneous detection of a face and speech in a series of contiguous frames; to produce representative images for use in an off-line editing system which reflect the predominant overall contents of each shot; and to calculate properties associated with encoding of the audio and video information.

Thus the metadata feature-vector information affords automated processing of the audio and video data prior to editing. Metadata describing the contents of the audio and video data is centrally stored in the metastore 20 and it is linked to the associated audio and video data by a unique identifier such as the SMPTE UMID. The audio and video data will generally be stored independently of the metadata. The use of the metastore makes feature-vector data easily accessible and provides a large information storage capacity.

The metastore also performs additional processing of feature-vector data, automating many processes that would otherwise be performed by the editor. The processed feature-vector data is potentially available at the beginning of the off-line editing process which should result in a much more efficient and less time-consuming editing operation.

Figure 2:
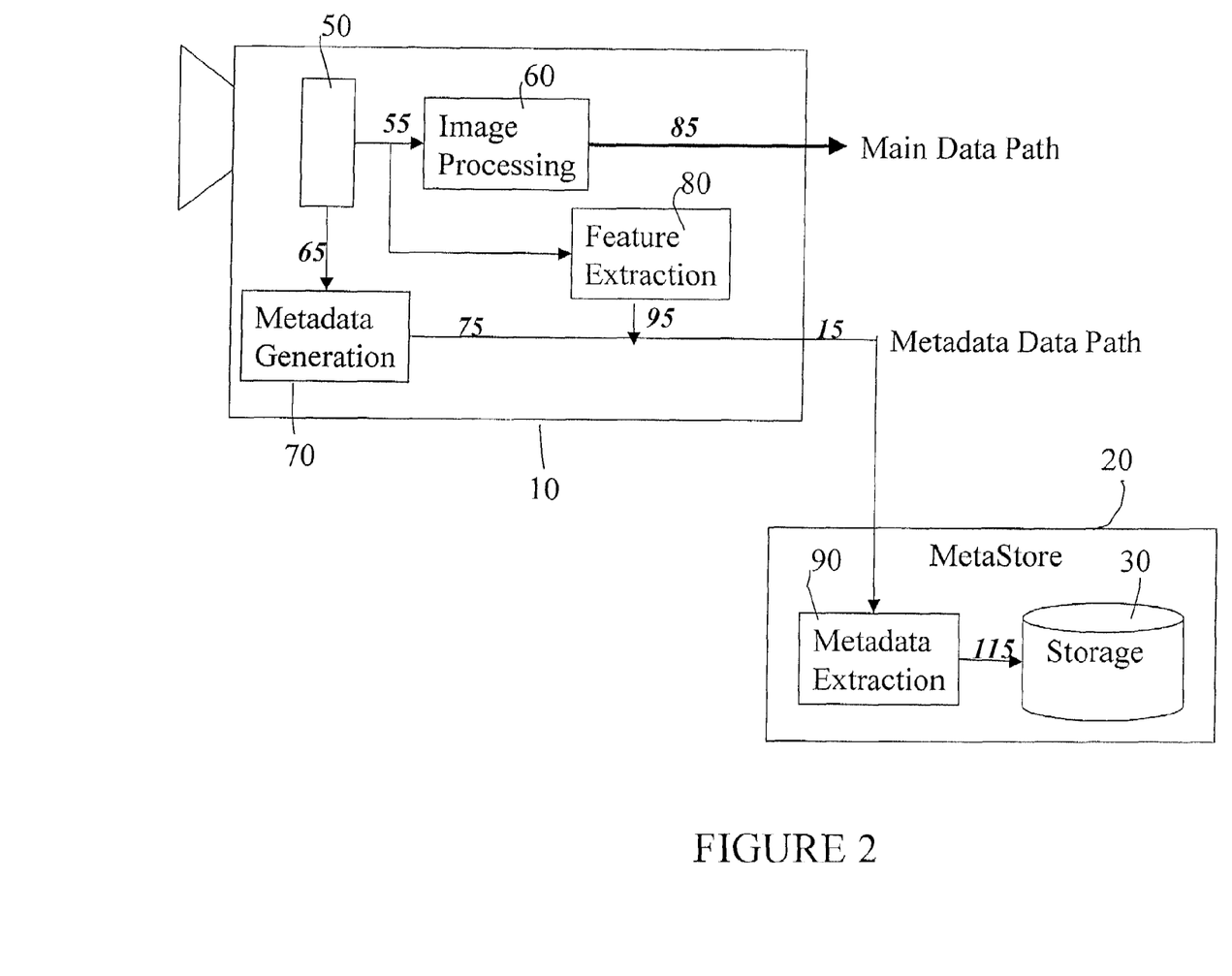
FIG. 2 shows a video camera and metastore according to embodiments of the invention.

FIG. 2 illustrates schematically how the main components of the video camera 10 and the metastore 20 interact according to embodiments of the invention. An image pickup device 50 generates audio and video data signals 55 which it feeds to an image processing module 60. The image processing module 60 performs standard image processing operations and outputs processed audio and video data along a main data path 85. The audio and video data signals 55 are also fed to a feature extraction module 80 which performs processing operations such as speech detection and hue histogram calculation, and outputs feature-vector data 95. The image pickup device 50 supplies a signal 65 to a metadata generation unit 70 that generates the basic metadata information 75 which includes a basic UMID and start/end timecodes. The basic metadata information and the feature-vector data 95 are multiplexed and sent along a metadata data path 15.

The metadata data path directed into a metadata extraction module 90 located in the metastore 20. The metadata extraction module 90 performs full metadata extraction and uses the feature-vector data 95 generated in the video camera to perform additional data processing operations to produce additional information about the content of the recorded sound and images. For example the hue feature vectors can be used by the metadata extraction module 90 (i.e. additional metadata) to perform sub-shot segmentation. This process will be described below. The output data 115 of the metadata extraction module 90 is recorded in the main storage area 30 of the metastore where it can be retrieved by an off-line editing apparatus.

Figure 3:
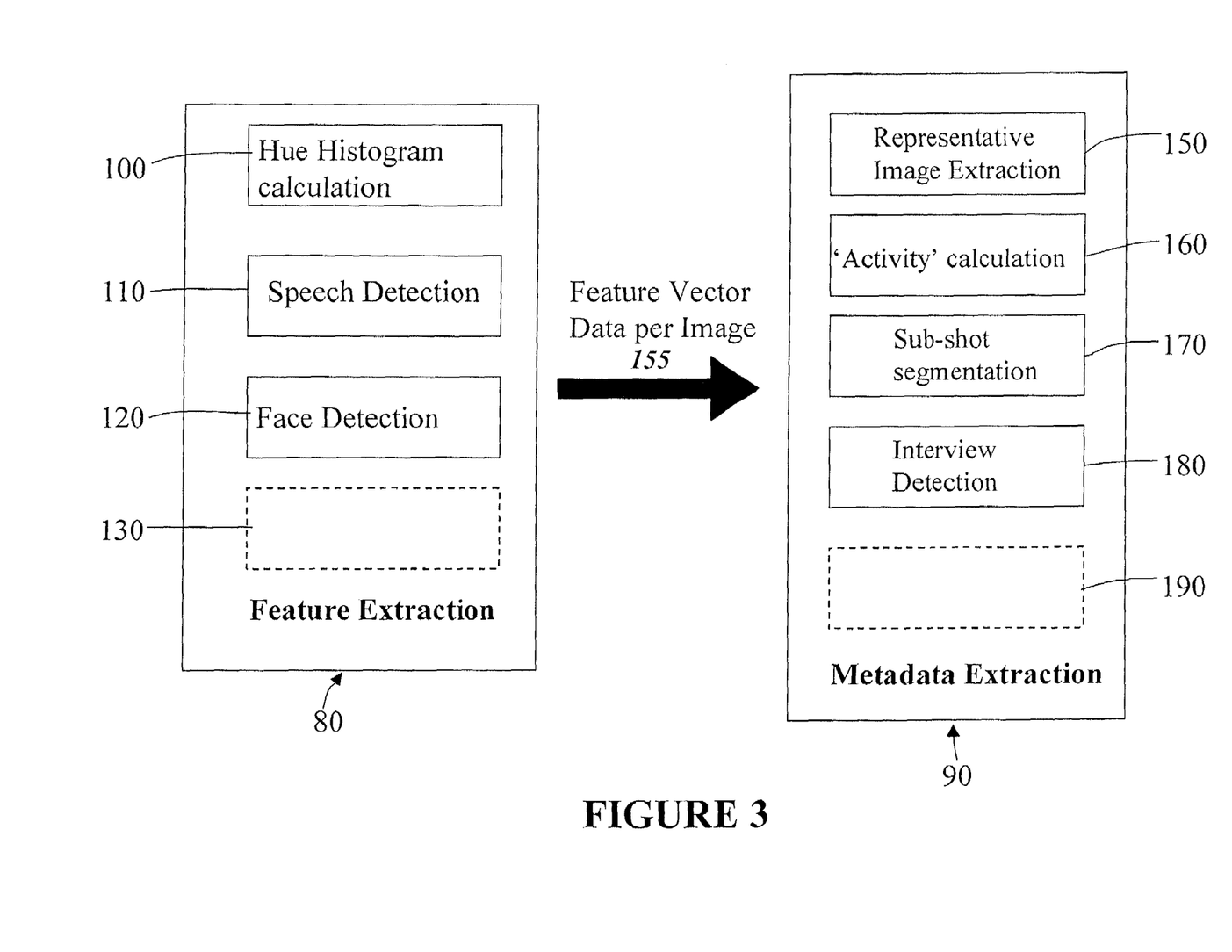
FIG. 3 is a schematic diagram of a feature extraction module and a metadata extraction module according to embodiments of the invention.

FIG. 3 is a schematic diagram of a feature extraction module and a metadata extraction module according to embodiments of the invention.

As mentioned above, the left hand side of FIG. 3 shows that the feature extraction module 80 of the video camera 10, comprises a hue histogram calculation unit 100, a speech detection unit 110 and a face detection unit 120. The outputs of these feature extraction units are supplied to the metadata extraction module 90 for further processing.

The hue histogram calculation unit 100 performs an analysis of the hue values of each image. Image pick-up systems in a camera detect primary-colour red, green and blue (RGB) signals. These signals are format-converted and stored in a different colour space representation. On analogue video tape (such as PAL and NTSC) the signals are stored in YUV space whereas digital video systems store the signals in the standard YCrCb colour space. A third colour space is hue-saturation-value (HSV). The hue reflects the dominant wavelength of the spectral distribution, the saturation is a measure of the concentration of a spectral distribution at a single wavelength and the value is a measure of the intensity of the colour. In the HSV colour space hue specifies the colour in a 360° range.

The hue histogram calculation unit 100 performs, if so required, the conversion of audio and video data signals from an arbitrary colour space to the HSV colour space. The hue histogram calculation unit 100 then combines the hue values for the pixels of each frame to produce for each frame a "hue histogram" of frequency of occurrence as a function of hue value. The hue values are in the range $0° \leq hue < 360°$ and the bin-size of the histogram, although potentially adjustable, would typically be 1°. In this case a feature vector with 360 elements will be produced for each frame. Each element of the hue feature vector will represent the frequency of occurrence of the hue value associated with that element. Hue values will generally be provided for every pixel of the frame but it is also possible that a single hue value will be derived (e.g. by an averaging process) corresponding to a group of several pixels. The hue feature-vectors can subsequently be used in the metadata extraction module 90 to perform sub-shot segmentation and representative image extraction.

The speech detection unit 110 in the feature extraction module 80 performs an analysis of the recorded audio data. The speech detection unit 110 performs a spectral analysis of the audio material, typically on a frame-by-frame basis. In this context, the term "frame" refers to an audio frame of perhaps 40 milliseconds duration and not to a video frame. The spectral content of each audio frame is established by applying a fast Fourier transform (FFT) to the audio data using either software or hardware. This provides a profile of the audio data in terms of power as a function of frequency.

The speech detection technique used in this embodiment exploits the fact that human speech tends to be heavily harmonic in nature. This is particularly true of vowel sounds. Although different speakers have different pitches in their voices, which can vary from frame to frame, the fundamental frequencies of human speech will generally lie in the range from 50-250 Hz. The content of the audio data is analysed by applying a series of "comb filters" to the audio data. A comb filter is an Infinite Impulse Response (IIR) filter that routes the output samples back to the input after a specified delay time. The comb filter has multiple relatively narrow pass-bands, each having a centre frequency at an integer multiple of the fundamental frequency associated with the particular filter. The output of the comb filter based on a particular fundamental frequency provides an indication of how heavily the audio signal in that frame is harmonic about that fundamental frequency. A series of comb filters with fundamental frequencies in the range 50-250 Hz is applied to the audio data.

When an FFT process is applied to the audio material first, as in this embodiment, the comb filter is conveniently implemented in a simple selection of certain FFT coefficients.

The sliding comb filter thus gives a quasi-continuous series of outputs, each indicating the degree of harmonic content of the audio signal for a particular fundamental audio frequency. Within this series of outputs, the maximum output is selected for each audio frame. This maximum output is known as the "Harmonic Index" (HI) and its value is compared with a predetermined threshold to determine whether or not the associated audio frame is likely to contain speech.

The speech detection unit 110 located in the feature extraction module 80, produces a feature-vector for each audio frame. In its most basic form this is a simple flag that indicates whether or not speech is present. Data corresponding to the harmonic index for each frame could also potentially be supplied as feature-vector data. Alternative embodiments of the speech detection unit 110 might output a feature-vector comprising the FFT coefficients for each audio frame, in which case the processing to determine the harmonic index and the likelihood of speech being present would be carried out in the metadata extraction module 90. The feature extraction module 80 could include an additional unit 130 for audio frame processing to detect musical sequences or pauses in speech.

The face detection unit 120 located in the feature extraction module 80, analyses video images to determine whether or not a human face is present. This unit implements an algorithm to detect faces such as the FaceIt® algorithm produced by the Visionics Corporation and commercially available at the priority date of this patent application. This face detection algorithm uses the fact that all facial images can be synthesised from an irreducible set of building elements. The fundamental building elements are derived from a representative ensemble of faces using statistical techniques. There are more facial elements than there are facial parts. Individual faces can be identified by the facial elements they possess and by their geometrical combinations. The algorithm can map an individual's identity into a mathematical formula known as a "faceprint". Each facial image can be compressed to produce a faceprint of around 84 bytes in size. The face of an individual can be recognised from this faceprint regardless of changes in lighting or skin tone, facial expressions or hairstyle and in the presence or absence of spectacles. Variations in the angle of the face presented to the camera can be up to around 35° in all directions and movement of faces can be tolerated.

The algorithm can therefore be used to determine whether or not a face is present on an image-by-image basis and to determine a sequence of consecutive images in which the same faceprint appears. The software supplier asserts that faces which occupy as little as 1% of the image area can be recognised using the algorithm.

The face detection unit 120 outputs basic feature-vectors 155 for each image comprising a simple flag to indicate whether or not a face has been detected in the respective image. Furthermore, the faceprint data for each of the detected faces is output as feature-vector data 155, together with a key or lookup table which relates each image in which at least one face has been detected to the corresponding detected faceprint(s). This data will ultimately provide the editor with the facility to search through and select all of the recorded video images in which a particular faceprint appears.

The right hand side of FIG. 3 shows that the metadata extraction module 90 of the video camera 10, comprises a representative image extraction unit 150, an "activity" calculation unit 160, a sub-shot segmentation unit 170 and an interview detection unit 180.

The representative image extraction unit 150 uses the feature vector data 155 for the hue image property to extract a representative image which reflects the predominant overall content of a shot. The hue histogram data included in feature-vector data 155 comprises a hue histogram for each image. This feature-vector data is combined with the sub-shot segmentation information output by sub-shot segmentation unit 170 to calculate the average hue histogram data for each shot.

The hue histogram information for each frame of the shot is used to determine an average histogram for the shot according to the formula:

$$h'_i = \frac{\sum_{F=1}^{n_F} h_i}{n_F}$$

where i is an index for the histogram bins, $h'_i$ is the average frequency of occurrence of the hue value associated with the ith bin, $h_i$ is the hue value associated with the ith bin for frame F and $n_F$ is the number of frames in the shot. If the majority of the frames in the shot correspond to the same scene then the hue histograms for those shots will be similar in shape therefore the average hue histogram will be heavily weighted to reflect the hue profile of that predominant scene.

The representative image is extracted by performing a comparison between the hue histogram for each frame of a shot and the average hue histogram for that shot. A singled valued difference $\text{diff}_F$ is calculated according to the formula:

$$diff_F = \sum_{l=1}^{nbins} \sqrt{(h'_i - h_i)^2}$$

For each frame F ($1 \leq F \leq n_F$) of a shot, one frame from the nF frames is selected which has the minimum value of $diff_F$. The above formula represents the preferred method for calculating the single valued difference; however it will be appreciated that alternative formulae can be used to achieve the same effect. An alternative would be to sum the absolute value of the difference ($h'_i - h'_j$), to form a weighted sum of differences or to combine difference values for each image property of each frame. The frame with the minimum difference will have the hue histogram closest to the average hue histogram and hence it is preferably selected as the representative keystamp (RKS) image for the associated shot. The frame for which the minimum difference is smallest can be considered to have the hue histogram which is closest to the average hue histogram. If the value of the minimum difference is the same for two frames or more in the same shot then there are multiple frames which are closest to the average hue histogram however the first of these frames can be selected to be the representative keystamp. Although preferably the frame with the hue histogram that is closest to the average hue histogram is selected to be the RKS, alternatively an upper threshold can be defined for the single valued difference such that the first frame in the temporal sequence of the shot having a minimum difference which lies below the threshold is be selected as an RKS. It will be appreciated that, in general, any frame of the shot having a minimum difference which lies below the threshold could be selected as an RKS. The RKS images are the output of representative image extraction unit 150.

The RKS images can be used in the off-line edit suite as thumbnail images to represent the overall predominant contents of the shots. The editor can see the RKS at a glance and its availability will reduce the likelihood of having to replay a given shot in real time.

The "activity" calculation unit 160 uses the hue feature-vector data generated by the hue histogram calculation unit 100 to calculate an activity measure for the captured video images. The activity measure gives an indication of how much the image sequence changes from frame to frame. It can be calculated on a global level such as across the full temporal sequence of a shot or at a local level with respect to an image and its surrounding frames. In this embodiment the activity measure is calculated from the local variance in the hue values. It will be appreciated that the local variance of other image properties such as the luminosity could alternatively be used to obtain an activity measure. The advantage of using the hue is that the variability in the activity measure due to changes in lighting conditions is reduced. A further alternative would be to use the motion vectors to calculate an activity measure.

The activity measure data output by the activity calculation unit will subsequently be used by the offline editing apparatus and metadata enabled devices such as video tape recorders and digital video disk players to provide the viewer of recorded video images with a "video skim" and an "information shuttle" function.

The video skim function is an automatically generated accelerated replay of a video sequence. During the accelerated replay, sections in the temporal sequence of images for which the activity measure is below a predetermined threshold are either replayed in fast shuttle or are skipped over completely.

The information shuttle function provides a mapping between settings on a user control (such as a dial on a VTR) and the information presentation rate determined from the activity measure of the video images. This is differs from a standard fast forward function which simply maps settings on the user control to the video replay rate and takes no account of the content of the images being replayed The "activity" calculation unit 160 also serves to measure the activity level in the audio signal associated with the video images. It uses the feature-vectors produced by the speech detection unit 110 and performs processing operations to identify temporal sequences of normal speech activity, to identify pauses in speech and to distinguish speech from silence and from background noise. The volume of the sound is also used to identify high audio activity. This volume-based audio activity information is particularly useful for identifying significant sections of the video footage for sporting events where the level of interest can be gauged by the crowd reaction.

The sub-shot segmentation module uses the feature vector data 155 for the hue image property to perform sub-shot segmentation. The sub-shot segmentation is performed by calculating the element-by-element difference between the hue histograms for consecutive images and by combining these differences to produce a single valued difference. A scene change is flagged by locating an image with a single valued-difference that lies above a predetermined threshold.

Similarly a localised change in the subject of a picture, such as the entry of an additional actor to a scene, can be detected by calculating the single-valued difference between the hue histogram of a given image and a hue histogram representing the average hue values of images from the previous one second of video footage.

The interview detection unit 180 uses the feature-vector data 155 output by the feature extraction module 80 to identify images and associated audio frames corresponding to interview sequences. In particular, the interview detection unit 180 uses feature vector data output by the speech detection unit 110 and the face detection unit 120 and combines the information in these feature vectors to detect interviews. At a basic level the simple flags which identify the presence/absence of speech and the presence/absence of at least one face are used to identify sequences of consecutive images where both speech and at least one face have been flagged. These shots are likely to correspond to interview sequences.

Once the shots associated with interviews have been flagged, the faceprint data of the feature vectors is subsequently used to identify participants in each interview. Furthermore the harmonic index audio data from the feature vectors could be used to help discriminate between the voices of interviewer and interviewee. The interview detection unit thus serves to identify shots associated with interviews and to provide the editor with the faceprints associated with the participants in each interview.

Figure 4:
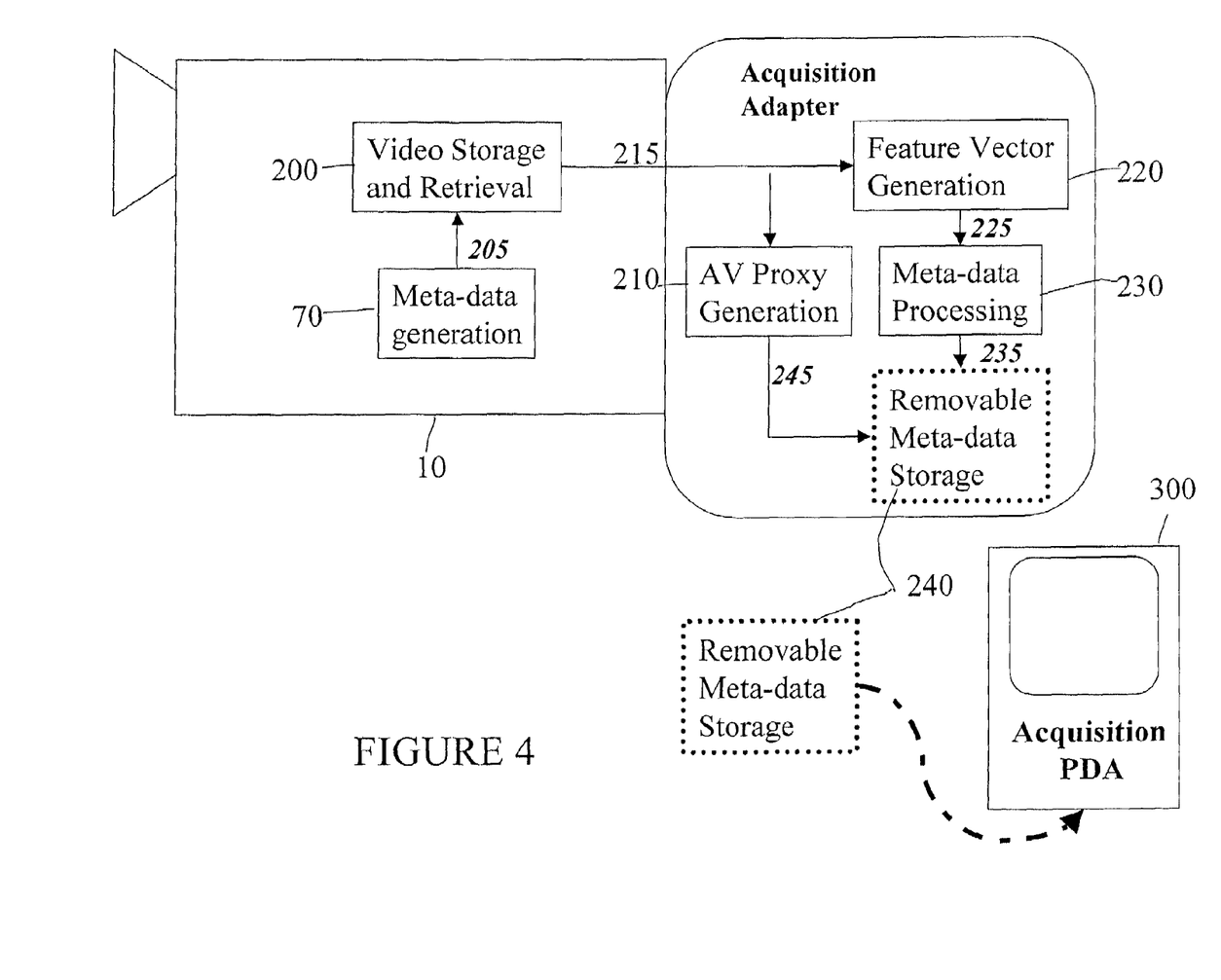
FIG. 4 shows a video camera and a personal digital assistant according to a first embodiment of the invention.

FIG. 4 shows a camera and a personal digital assistant according to a second embodiment of the invention. The camera includes an acquisition adapter 270 that performs functions associated with the downstream audio and video data processing. The acquisition adapter 270 illustrated in this particular embodiment is a distinct unit which interfaces with the camera via a built-in docking connector. However, it will be appreciated that the acquisition unit hardware could alternatively be incorporated in the main body of the camera.

In the main body of the camera, the metadata generation unit 70 generates an output 205 that includes a basic UMID and in/out timecodes per shot. The output 205 of the metadata generation unit 70 is fed as input to a video storage and retrieval module 200 that stores the main metadata and the audio and video data recorded by the camera. The main metadata 205 could be stored on the same videotape as that on which the audio and video data is stored or it could be stored separately, for example, on a memory integrated circuit formed as part of a cassette label.

The audio and video data and the basic metadata 205 are output as an unprocessed data signal 215 which is supplied to the acquisition adapter unit 270 of the camera 10. The unprocessed data signal 215 is input to a feature vector generation module 220 which processes the audio and video data frame-by-frame and generates feature vector data which characterises the contents of the respective frame. The output 225 of the feature vector generation module 220 includes the audio data, the video images, the main metadata and the feature-vector data. All of this data is provided as input to a metadata processing module 230.

The metadata processing module 230 generates the 32-bytes of signature metadata for the extended UMID. This module performs processing of the feature vector data such as analysis of the hue vectors to select an image from a shot which is representative of the predominant overall contents of the shot. The hue feature-vectors can also be used for performing sub-shot segmentation. In this particular embodiment, the processing of feature-vectors is performed in the camera acquisition unit 270, but it will be appreciated that this processing could alternatively be performed in the metastore 20. The output of the metadata processing module 230 is a signal 235 comprising processed and unprocessed metadata which is stored on a removable storage unit 240. The removable storage unit 240 could be a flash memory PC card or a removable hard disk drive.

The metadata is preferably stored on the removable storage unit 240 in a format such as extensible markup language (XML) that facilitates selective context-dependent data retrieval. This selective data retrieval is achieved by defining custom "tags" which mark sections in the XML document according to special categories such as metadata objects and metadata tracks.

In this embodiment the removable metadata storage unit 240 can be physically removed from the video camera and plugged directly into the acquisition PDA 300 where the metadata can be viewed and edited.

The unprocessed data signal 215 generated by the main camera unit which includes the recorded basic audio and video data, apart from being supplied to the feature vector generation module, is also supplied to an AV proxy generation module 210 located in the acquisition adapter 270. The AV proxy generation module 210 produces a low bit-rate copy of the high bit-rate broadcast quality video and audio data signal 215 produced by the camera 10.

The AV proxy is required because the video bit rate of high-end equipment such as professional digital betacam cameras is currently around 100 Mbits per second and this data-rate is likely to be too high to be appropriate for use by low-end equipment such as desktop PC's and PDAs. The AV proxy generator 210 performs strong data compression to make a comparatively low (e.g. around 4 Mbits/sec) bit-rate copy of the master material. An AV proxy output signal 245 comprises low bit-rate video images and audio data. The low bit-rate AV proxy, although not of broadcast quality, is of sufficient resolution for use in browsing the recorded footage and for making off-line edit decisions. The AV proxy output 245 is stored alongside the metadata 235 on the removable storage unit 235. The AV proxy can be viewed on the acquisition PDA 300 by transferring the removable storage unit 240 from the acquisition adapter 270 to the PDA 300.

Figure 5:
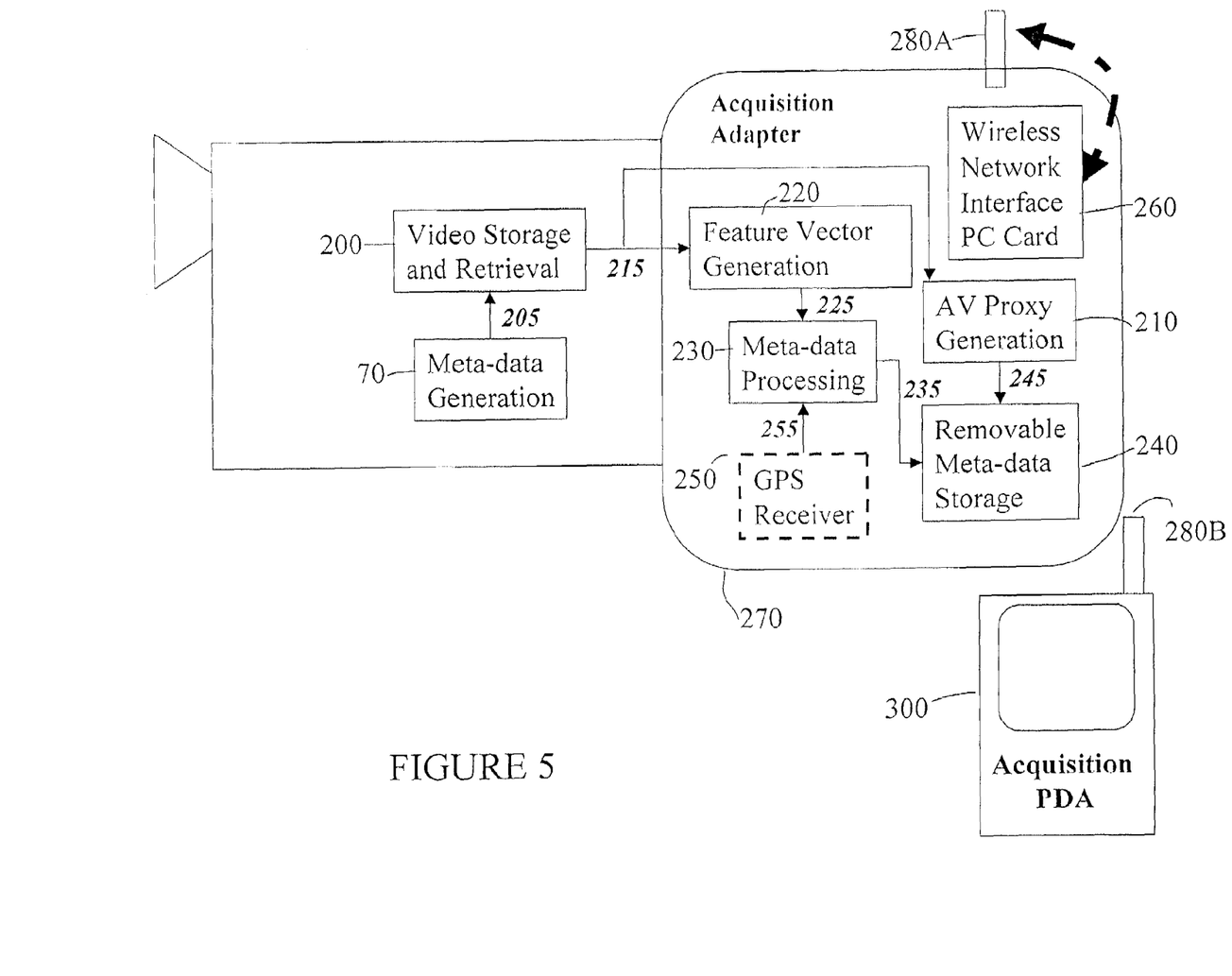
FIG. 5 shows a camera and a personal digital assistant according to a second embodiment of the invention.

FIG. 5 shows a camera and a PDA according to a second embodiment of the invention. Many of the modules in this embodiment are identical to those in the embodiment corresponding to FIG. 4. A description of the functions of these common modules can be found in the above description of FIG. 4 and shall not be repeated here.

The embodiment of the invention shown in FIG. 5 has an additional optional component located in the acquisition adapter 270. This is a GPS receiver 250. The GPS receiver 250 outputs a spatial co-ordinate data signal 255 as required for generation of the signature metadata component of the extended UMID. The signature metadata is generated in the metadata processing module 230. Essentially, the GPS co-ordinates of the camera serve as a form of identification for the recorded material. It will be appreciated that the GPS receiver 250 could also be optionally included in the embodiment of FIG. 4.

The main distinction of second embodiment illustrated in FIG. 5 is distinguished with respect to the first embodiment of FIG. 4 is that it comprises a wireless network interface PC card together with aerials 280A on the camera and 280B on the PDA. This reflects the fact that in this embodiment, the acquisition adapter 270 is connected to the acquisition PDA by a wireless local area network (LAN).

The wireless LAN (wireless 802.11b with 10/100 base-t) can typically provide a link within a 50 meter range and with a data capacity of around 11 Mbits/sec. A broadcast quality image has a bandwidth of around 1 Mbit/image therefore it would ineffective to transmit broadcast quality video footage across the wireless LAN. However, the reduced bandwidth AV proxy may be transmitted effectively to the PDA across the wireless link.

The removable storage unit 240 can also be used to physically transfer data between the acquisition adapter and the PDA, but without the wireless LAN link metadata annotations cannot be made while the camera is recording because during recording the storage unit 240 will be located in the camera. The wireless LAN link between the camera 10 and the PDA 300 has the additional advantage over the embodiment of FIG. 4 that metadata annotations such as the name of an interviewee or the title of a shot can be transferred from the PDA to the camera while the video camera is still recording. These metadata annotations could potentially be stored on the removable storage unit 240 while it is still located in the camera's acquisition adapter. The wireless LAN connection should also allow low bit-rate versions of recorded sound and to be downloaded to the PDA while the video camera is still running.

If the metadata and AV proxy is stored in the removable storage unit 240 in a format such as XML then the PDA 300 can selectively retrieve data from the XML data files in the camera to avoid wasting precious bandwidth.

Figure 6:
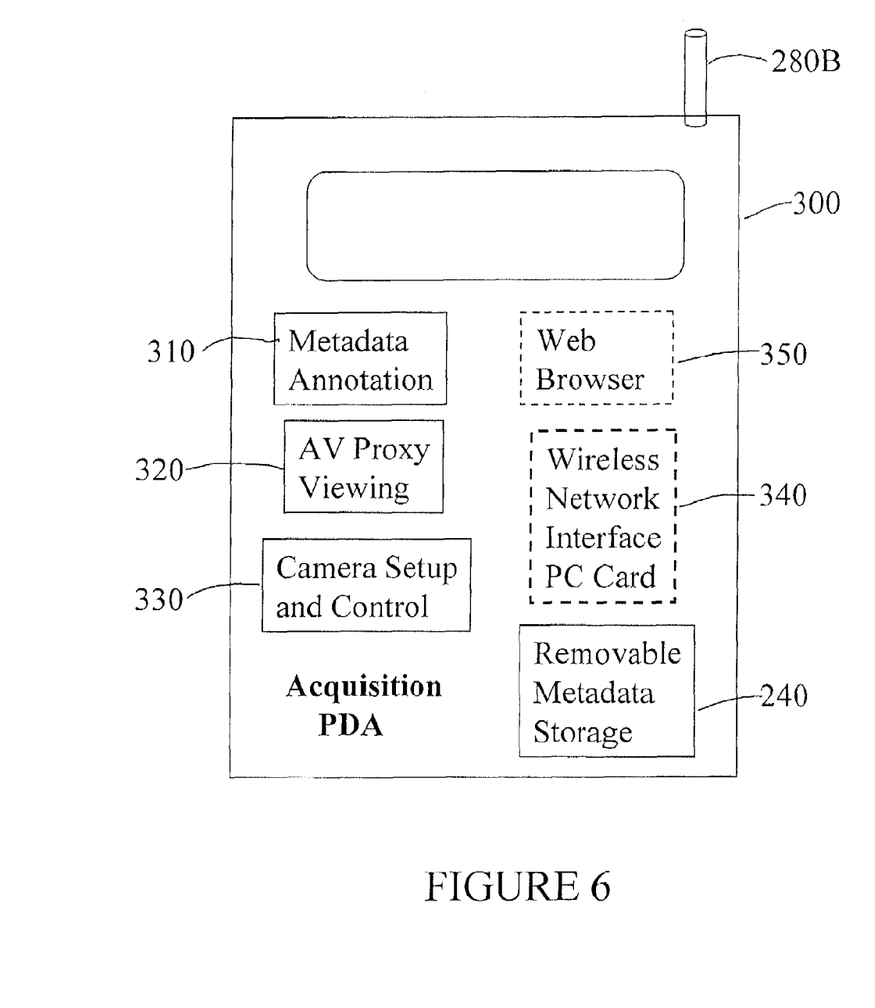
FIG. 6 is a schematic diagram illustrating the components of the personal digital assistant according to embodiments of the invention.

FIG. 6 is a schematic diagram illustrating the components of the personal digital assistant 300 according to embodiments of the invention. The PDA optionally comprises a wireless network interface PC card and the aerial 280B to enable connectivity via the wireless LAN. The PDA 300 optionally comprises a web browser 350 which would provide access to data on the internet.

The metadata annotation module allows the user of the PDA to generate metadata to annotate the recorded audio and video footage. Such annotations might include the names and credentials of actors; details of the camera crew; camera settings; and shot titles.

An AV proxy viewing module 320 provides the facility to view the low-bit-rate copy of the master recording generated by the acquisition adapter. The AV proxy viewing module 320 will typically include offline editing functions to allow basic editing decisions to be made using the PDA and to record these as an edit decision list for use in on-line editing. The PDA 300 also includes a camera set-up and control module 330 which would give the user of the PDA the power to change the orientation or the settings of the camera remotely. The removable storage 240 can be used for transferring recorded audio-visual data and metadata between the camera 10 and the PDA.

Figure 7:
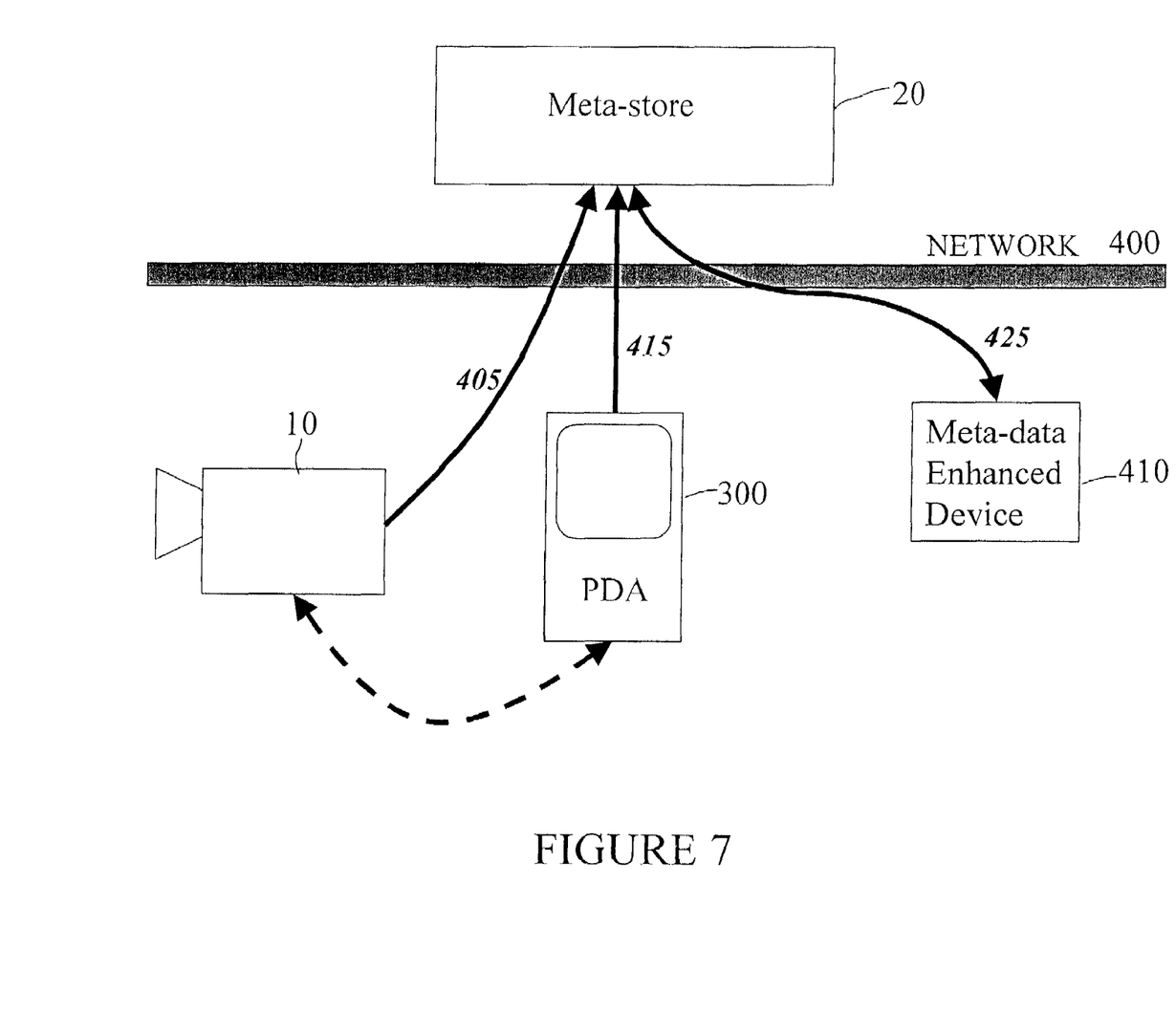
FIG. 7 is a schematic diagram of an audio and video information processing and distribution system according to embodiments of the invention.

FIG. 7 is a schematic diagram of an audio and video information processing and distribution system according to embodiments of the invention. The backbone of the system is the network 400 which could be a local network such as an intranet or even an internet connection.

The camera 10 is connected to the PDA 300 via a wireless LAN and/or by the removable storage medium 240. The camera and PDA are each in communication with the metastore 20 via the network 400. A metadata enhanced device 410, which could be a video tape recorder or off-line editing apparatus has access to the metastore 20 via the network 400. A multiplicity of these metadata enhanced devices could be connected to the network 400. This audio and video information processing and distribution system should enable remote access to all metadata deposited in the metastore 20. Thus the metadata associated with given audio data and video images stored on videotape could be identified via the UMID and downloaded from the metastore via the network 400.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A camera-recorder apparatus comprising:
   an image capture device operable to capture a plurality of video images;
   a storage medium by which said video images are stored for later retrieval;
   a feature extraction unit operable to derive image feature vector data from said image content of at least one of said video images substantially in real time at said capture of said video images, said image feature vector data including color distribution data associated with respective images;
   a metadata extraction unit operable to derive image property data from said image feature vector data substantially in real time at said capture of said video images, said image property data being associated with said respective images, and including sub shot segmentation data derived from said color distribution data; and
   a data path by which said camera-recorder apparatus is operable to transfer said derived image property data to an external data processing apparatus.

2. The apparatus according to claim 1, in which said image feature vector data includes face recognition data.

3. A camera-recorder apparatus comprising:
   an image capture device operable to capture a plurality of video images;
   a storage medium by which said video images are stored for later retrieval;
   a feature extraction unit operable to derive image feature vector data from image content of at least one of said video images substantially in real time at said capture of said video images, said image feature vector data including color distribution data associated with respective images;
   a metadata extraction unit operable to derive image property data from said image feature vector data substantially in real time at said capture of said video images, said image property data being associated with said respective images, said image property data including activity measure data derived from a variance of said color distribution data and indicative of a change of said image content or said audio content between said video images; and
   a data path by which said camera-recorder apparatus is operable to transfer said derived image property data to an external data processing apparatus.

4. The apparatus according to claim 3, in which said image feature vector data includes face recognition data.

5. A camera-recorder apparatus comprising:
   an image capture device operable to capture a plurality of video images;
   a storage medium by which said video images are stored for later retrieval;
   a feature extraction unit operable to derive image feature vector data from said image content of at least one of said video images substantially in real time at said capture of said video images, said image feature vector data including color distribution data associated with respective images;
   a metadata extraction unit operable to derive image property data from said image feature vector data substantially in real time at said capture of said video images, said image property data being associated with said respective images, said image property data includes a representative key frame derived from said color distribution data and indicative of a predominant overall content of said video images; and
   a data path by which said camera-recorder apparatus is operable to transfer said derived image property data to an external data processing apparatus.

6. The apparatus according to claim 5, in which said image vector data includes face recognition data.

7. A camera-recorder apparatus comprising:
   an image capture device operable to capture a plurality of video images;
   a storage medium by which said video images are stored for later retrieval;
   a feature extraction unit operable to derive image feature vector data from said image content of at least one of said video images substantially in real time at said capture of said video images, said image feature vector data being associated with respective images;
   a metadata extraction unit operable to derive image property data from said image feature vector data substantially in real time at said capture of said video images, said image property data being associated with said respective images or groups of images; and
   a data path by which said camera-recorder apparatus is operable to transfer said derived image property data to an external data processing apparatus,
   in which:
   said camera-recorder apparatus is operable to capture an audio signal associated with said video images;
   said feature extraction unit is operable to derive audio feature vector data identifying speech content for portions of said audio signal associated with at least one of said video images; and
   said image property data includes interview detection data indicative of an interview sequence of said video images, said video images of said interview sequence including identified facial images co-occurring with respect to said audio signal that is associated with said video images of said interview sequence comprising speech.

8. The apparatus according to claim 7, in which said image feature vector data includes at least color distribution data and/or face recognition data.

9. The apparatus according to claim 7, in which said audio feature vector data comprises speech detection data.

10. The apparatus according to claim 9, in which:
said audio feature vector data comprises speech detection data; and
said metadata extraction unit is operable to derive said interview detection data from said face recognition data and said speech detection data.

* * * * *